Jan. 19, 1932.  H. GRAY  1,841,803

TRAVELING VALVE MECHANISM

Filed Aug. 20, 1929

Inventor
Harry Gray
By
Hardway Cather
Attorneys

Patented Jan. 19, 1932

1,841,803

UNITED STATES PATENT OFFICE

HARRY GRAY, OF HOUSTON, TEXAS

TRAVELING VALVE MECHANISM

Application filed August 20, 1929. Serial No. 387,236.

This invention relates to new and useful improvements in a traveling valve mechanism.

One object of the invention is to provide a traveling valve mechanism for pumps, so constructed that it may be readily assembled into one, or a multiple of units, and having a novel type of packing rings, and pressure rings, held expanded, in a novel manner, against the pump working barrel, and a flush, or discharge ring assembled in a novel manner, therewith and provided to direct the pumped fluid so as to flush the sand off of the barrel above the valve mechanism.

Another object of the invention is to provide a novel type of coupling for connecting the units together, with a valve lubricator incorporated into said coupling.

A further feature of the invention is to provide a novel type of locking device for locking the parts against accidental separation.

A still further feature of the invention is to provide a novel type of guided ball valve cage.

With the above and other objects in view this invention has particular relation to certain novel features of construction, operation and arrangement of parts, an example of which is given in this specification and illustrated in the accompanying drawings, wherein:—

Figures 1, 2:
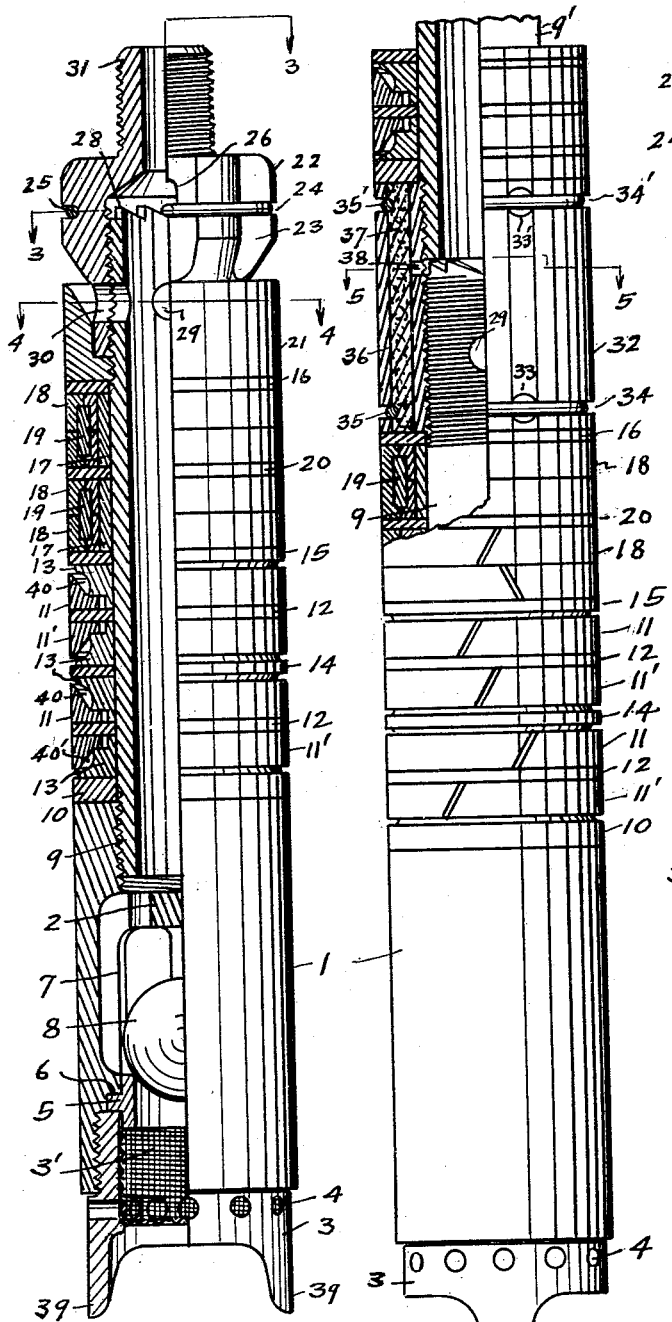
Figure 1 shows a side view of the valve mechanism, partly in section, and showing a single unit assembly.
Figure 2 shows a side view partly in section, showing a multiple of units connected together.
Figure 3:
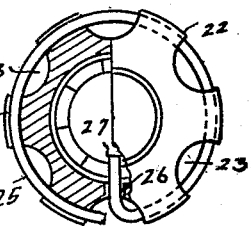
Figure 3 shows a sectional view taken on the line 3—3 of Figure 1.
Figure 4:
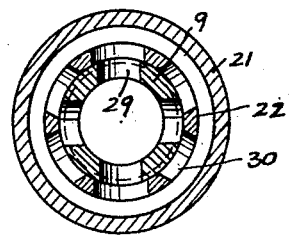
Figure 4 shows a sectional view taken on the line 4—4 of Figure 1.
Figure 5:
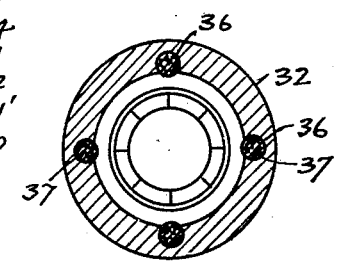
Figure 5 shows a sectional view taken on the line 5—5 of Figure 2.

Referring now more particularly to the drawings, wherein like numerals of reference designate similar parts in each of the figures the numeral 1 designates the tubular valve body of a general cylindrical form and which has a transverse perforated web 2 therein beneath the upper end thereof. Screwed into the lower end of the body there is an annular retainer 3 whose lower end is open and which has the radial passageways 4 above said lower end. A foraminated basket-like screen 3' may be confined within the retainer 3 if desired. A valve seat 5 is clamped in the body between the upper end of said retainer and the inside annular shoulder 6 in the body. The body has the inside integral guide-ribs 7 between the web 2 and the shoulder 6 which serve to guide the ball valve 8, and confine the same to vertical movement in said body. The valve 8 is confined within the body and cooperates with, and controls the passage of fluid through, the seat 5.

The lower end of the inner tube 9 is threaded into the top of the body 1 and around this tube and resting on the top of the body there is the bottom washer 10. Seated on this washer 10 there is an assembly of split pressure rings arranged in pairs, each pair consisting of the split rings 11, 11', the former of each pair being upwardly turned, and the latter of each pair being downwardly turned. Said pressure rings are of the cup shaped type and between the respective rings of each pair are the separating washers 12. The rings of each pair are clamped in assembled relation by means of the clamp rings 13, 13 which surround the tube 9, and clamp said pairs of rings on each side. Between the pairs of pressure ring assemblies there is the separating annular washer 12 and above it there is an assembly of expansion rings which are clamped between said washer 15 on one side and the annular washer 16 above, as shown, on the other side. Each expansion ring assembly comprises an inner spacer sleeve 17 around the tube 9 and around it the sectional annular assembly of split ring sections 18 assembled about the annular seal ring 19 breaking the joints between the ring sections 18 and enclosed or housed within said ring sections. The expansion ring assemblies are separated by the annular washer 20 located between them.

As stated a single unit assembly is illustrated in Figure 1 and in this assembly there is an upwardly opening cup shaped flush ring 21 seated on the washer 16 around the upper end of the tube 9 which is clamped in place by the overshot nipple 22 whose lower end is reduced and threaded onto the upper end of the tube 9 and clamps said flush ring between it and the washer 16. The nipple 22 has the vertical side grooves 23 therein and also has an annular peripheral groove 24 therearound in which is seated the flexible dog ring 25 one end of which is inwardly turned through the bearing 26 of said nipple and forms a spring dog 27 engageable with the ratchet teeth 28 into which the upper end of the tube 9 is formed and so pitched as to readily pass said dog as the nipple is screwed home, but said dog will engage with an appropriate ratchet tooth to prevent the unscrewing of said nipple. When the nipple is screwed home the openings 29 around the upper end thereof will register, or partially register, with corresponding openings 30 through the reduced lower end of said nipple to provide passageways for the fluid being pumped. The dog ring 25 is preferably made of spring steel and may be readily unseated from its groove and dog 27 disengaged from its engaged tooth 28 to permit the unscrewing of the nipple 22.

The nipple 22 is tubular and has the reduced outwardly threaded upper end providing for the attachment of a sucker rod thereto, through which the traveling valve mechanism may be reciprocated.

If it be desired to provide a traveling valve mechanism consisting of a plurality of units, connected together as indicated in Figure 2, the nipple 22 and the flush ring 21 may be removed and the coupling 32 may be screwed onto the upper end of the tube 9 and a similar tube 9' threaded into the upper end of said coupling 32 as illustrated in Figure 2. A pressure ring assembly and an expansion ring assembly may then be mounted upon the tube 9' as hereinabove explained and the flush ring 21 and nipple 22 may then be connected to the upper end of the tube 9' in the same manner as shown in Figure 1.

The coupling 32 is secured to the lower and upper tubes 9, 9' by means of the set screws 33, 33' and said coupling has the lower and upper annular grooves 34, 34' therearound in which are seated the lock rings 35, 35' which fit into transverse grooves in the heads of the respective set screw 33, 33' and lock them against unscrewing.

The coupling 32 also has a plurality of vertical bores 36, from end to end thereof filled with suitable filtering material 37. The grooves 35, 35' are cut into the bores 36, as is illustrated in Figure 2 and said coupling 32 has the inside ports 38 leading from the interior thereof into the respective bores 36. The fluid being pumped may pass through the ports 38 and through the filters 37 and out through the grooves 35, 35' to the external surface of the traveling valve mechanism so as to sufficiently lubricate the same, the filter excluding sand and grit. It will be particularly desirable to thus lubricate the traveling valve mechanism when it is made up of a plurality or multiple of units or assemblies as in such case sufficient of the oil being pumped would not work in between the traveling valve mechanism and pump barrel to adequately lubricate the same.

In assembling the pump and lowering the same in the well the traveling valve may be located in the working barrel and said barrel then attached to the lower end of the tubing and let down into the well. The sucker rod may then be lowered down through the tubing and screwed onto the reduced upper end 31, of the nipple 22 and while it is being so attached the traveling valve mechanism will be held against turning by means of the prongs 39, 39' at its lower end which will interengage with similar prongs upstanding from the conventional standing valve at the lower end of said barrel. The traveling valve mechanism will thus not be injured as it would likely be in case it should be lowered down through the tubing into the working barrel after the working barrel has been located in the well.

When the pump has been located in the well, and connected up for operation, the traveling valve mechanism may be reciprocated up and down through the sucker rod in the usual way, upon up stroke thereof.

Fluid which may find its way between the traveling valve mechanism and working barrel will be forced into the annular spaces 40 between the cup rings 11 and the clamp rings above them, upon up stroke of the traveling valve mechanism, and upon down stroke of the traveling valve mechanism said fluid will collect in the annular spaces 40' between the cup rings 11' and the clamp ring 13 beneath them and said cup rings 11, 11' will thus be held by said pressure closely against the working barrel so as to prevent leakage past them. The pressure rings 11, 11' will preferably be formed of a suitable composition material and the washers 12 between them may be formed of a similar material or of metal while the clamp rings 13 are preferably formed of metal. The sleeves 17, and the inner sections of the expansion ring assemblies are preferably formed of metal while the outer sections of the expansion ring assemblies will be formed of suitable composition material. The associated washers 15, 16 and 20 may be formed of metal or composition material. The sealing rings 19 housed within the expansion ring assemblies are preferably formed of rubber. A certain amount of oil will eventually find its way through the joints between the sections of the expansion ring assemblies 18 and this oil will impregnate said seal rings 19 causing them to swell or expand thus forcing the expansion ring out closely against the working barrel. The flush ring 21 will be formed of a suitable metal and its upper end is outwardly flared so that the pumped fluid will be directed upwardly and outwardly against the inner wall of the working barrel above so as to keep said wall flushed and free of grit and sand.

It is to be noted that the overshot nipple 22 is of a transverse diameter equal to that of the valve mechanism beneath so that it will fit closely within the working barrel and within the tubing when the valve mechanism is being withdrawn and will thus form a protection for the flush ring 21 to prevent its mutilation or injury while withdrawing said mechanism up through the well tubing. This overshot nipple has the vertical grooves 23 as stated to provide ample fluid passageway for the fluid being pumped.

It some times happens that sand and grit will collect in the pump barrel above the valve mechanism described and in such event a tubular sucker rod should be used, instead of a solid one, and flushing fluid may then be forced down through said tubular sucker rod and out through the ports 29, 30 and deflected upwardly by the flush ring 21 so as to wash out the pump barrel and tubing above. The reduced upper end of the nipple 22 has been made tubular to provide for this flushing operation when the pump is to be used in a well liable to sand up.

The drawings and description describe what is now considered preferred forms of the invention while the broad principle of the invention will be defined by the appended claims.

What I claim is:

1. In a traveling valve mechanism having a tubular valve body, and a reduced tubular extension upstanding from the body pressure rings and expansion rings around said extension, an upwardly flared flush ring about the upper end of said extension, and means for maintaining said rings in assembled relation with said extension.

2. In a traveling valve mechanism including a tubular valve body, a reduced tubular extension upstanding from said body; ring assemblies about said extension, an upwardly flared flush ring on said extension above said assemblies said extension having ports to direct the pumped fluid out from the interior of the extension against the inside, upwardly flared face of said flush ring, a connecting nipple connected to the upper end of said extension and having a transverse diameter substantially the same as that of said body and having external grooves through which the fluid beneath may pass upwardly about said nipple.

3. In a traveling valve mechanism having a tubular valve body, and a reduced tubular extension upstanding from said body, pressure rings and expansion rings assembled on said extension, a flush ring on the upper end of said extension effective to hold said pressure rings and expansion rings thereon said flush ring having an upwardly flared inside face, there being ports leading outwardly from the interior of said extension through which the pumped fluid may pass, said ports being located to direct the fluid against the inner flared face of the flush ring.

4. In a traveling valve mechanism having a tubular valve body, and a reduced tubular extension upstanding from said body, and formed of sections; a lubricator coupling connecting said sections, said coupling having a bore therein, filtering means in said bore, there being ports, one leading from the interior of said extension into said bore and another leading from said bore outwardly through the coupling, rings on said extension, beneath and above said coupling to which a lubricant may be fed through said bore.

5. In a traveling valve mechanism having a tubular valve body, a reduced tubular extension upstanding from said body, formed of sections; a lubricator coupling connecting said sections, said coupling having a bore therein, filtering means in said bore, there being ports, one leading from the interior of said extension into said bore and another leading from said bore outwardly through the coupling, rings on said extension to which a lubricant may be supplied, through said bore, beneath and above said coupling, the rings beneath the coupling being confined between the body and coupling, and means on the upper end of said coupling for confining the rings above said coupling.

In testimony whereof I have signed my name to this specification.

HARRY GRAY.